United States Patent
Sieben et al.

(10) Patent No.: US 7,606,869 B2
(45) Date of Patent: Oct. 20, 2009

(54) METHOD AND DEVICE FOR THE EXCHANGE OF DATA

(75) Inventors: Ulrich Sieben, Reute (DE); Miodrag Temerimac, Gundelfingen (DE); Burkhard Swirski, Reute (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 10/499,774

(22) PCT Filed: Dec. 17, 2002

(86) PCT No.: PCT/EP02/14390

§ 371 (c)(1),
(2), (4) Date: Feb. 18, 2005

(87) PCT Pub. No.: WO03/054677

PCT Pub. Date: Jul. 3, 2003

(65) Prior Publication Data

US 2005/0193086 A1 Sep. 1, 2005

(30) Foreign Application Priority Data

Dec. 21, 2001 (DE) ............................. 101 63 522

(51) Int. Cl.
- *G06F 15/167* (2006.01)
- *G05B 11/01* (2006.01)
- *B60Q 1/00* (2006.01)
- *G08G 1/123* (2006.01)

(52) U.S. Cl. .................. 709/216; 700/11; 340/436; 340/988

(58) Field of Classification Search .................. None
See application file for complete search history.

(56) References Cited

U.S. PATENT DOCUMENTS

| 5,555,376 A | 9/1996 | Theimer et al. ........ 395/200.09 |
| 5,555,379 A | 9/1996 | Silla ........................... 395/250 |

(Continued)

FOREIGN PATENT DOCUMENTS

WO          WO 00/25479          5/2000

(Continued)

OTHER PUBLICATIONS

N. Glance et al. "Pollen: using people as a communication medium" (2001) 429-442.

(Continued)

*Primary Examiner*—Wen-Tai Lin
(74) *Attorney, Agent, or Firm*—O'Shea Getz P.C.

(57) ABSTRACT

A system for exchanging data includes at least two memory units, each unit functioning as both a transmitter and a receiver of data. The exchange of data occurs whenever at least two memory units are within a certain distance of each other. The user is thus capable of simultaneously being both a transmitter and a receiver of data, such that the transmitter can send data continuously but can receive data transmitted from other memory units only when the receiver is within a certain distance from a transmitter. As a result, data are received only by those memory units that are located in the immediate environment of the transmitter. Since the data transmitted can be selected personally by the user, the data thus reflects the preferences of the user acting as the transmitter.

21 Claims, 1 Drawing Sheet

U.S. PATENT DOCUMENTS

| | | | | |
|---|---|---|---|---|
| 5,610,595 | A | | 3/1997 | Garrabrant et al. ..... 340/825.52 |
| 5,638,423 | A | | 6/1997 | Grube et al. ................... 379/58 |
| 5,991,758 | A | * | 11/1999 | Ellard ............................ 707/6 |
| 6,091,956 | A | | 7/2000 | Hollenberg ................. 455/456 |
| 6,202,023 | B1 | | 3/2001 | Hancock et al. ............. 701/201 |
| 6,326,903 | B1 | * | 12/2001 | Gross et al. .................. 340/988 |
| 6,571,279 | B1 | | 5/2003 | Herz et al. ................... 709/217 |
| 6,850,252 | B1 | * | 2/2005 | Hoffberg .................... 715/716 |
| 2002/0036571 | A1 | * | 3/2002 | Takahashi et al. ........... 340/901 |
| 2002/0065564 | A1 | * | 5/2002 | Sheriff et al. .................. 700/11 |
| 2002/0080142 | A1 | | 6/2002 | Takase et al. ............... 345/530 |
| 2002/0129170 | A1 | * | 9/2002 | Moore et al. ................ 709/249 |
| 2003/0004802 | A1 | * | 1/2003 | Callegari ..................... 705/14 |
| 2004/0201711 | A1 | * | 10/2004 | Lopaz ................... 348/211.99 |

FOREIGN PATENT DOCUMENTS

| | | |
|---|---|---|
| WO | WO 01/22633 | 3/2001 |
| WO | WO 2004/025479 | 3/2004 |

OTHER PUBLICATIONS

E. Chavez et al. "Interactive applications of personal situation-aware assistants" (1999) 903-915.

Tan Xin, "Bluetooth: Constructing a Wireless Personal Local Area Network," China Radio Management, vol. 3, pp. 29-31, 2001.

Chinese Office Action, Apr. 11, 2008.

* cited by examiner

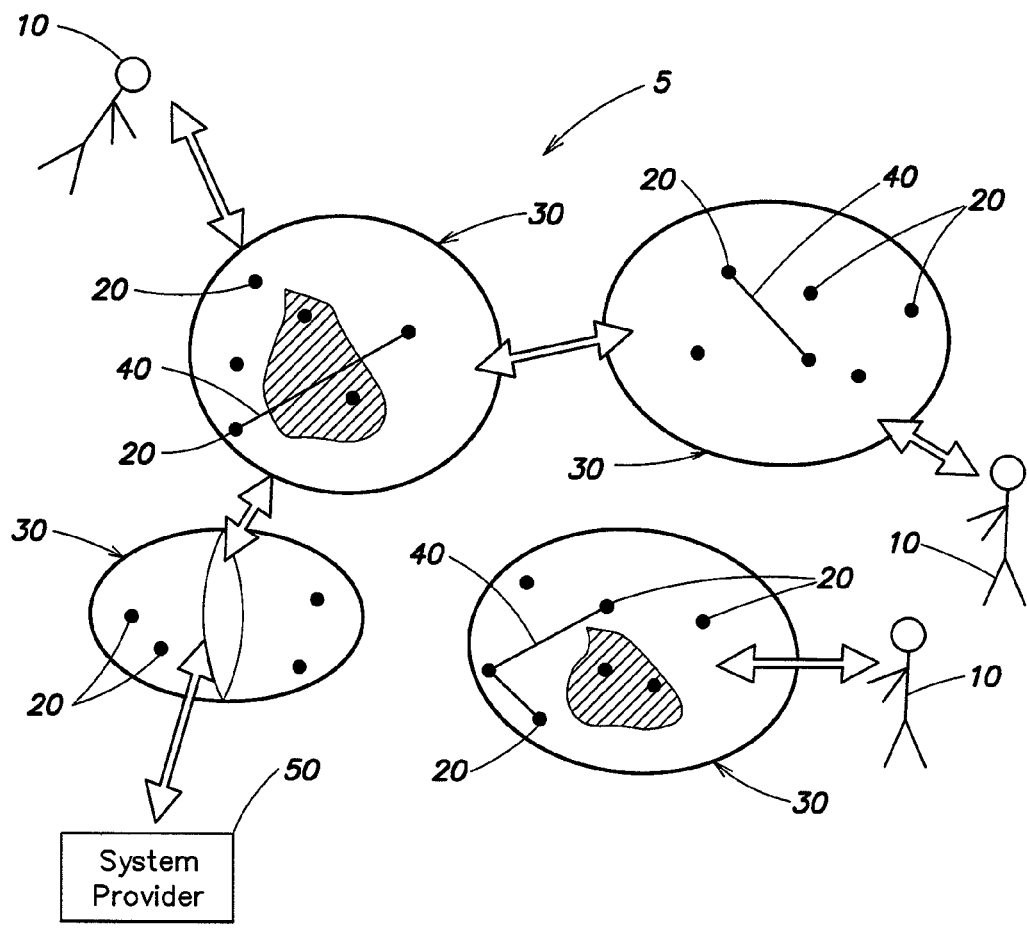
FIGURE

METHOD AND DEVICE FOR THE EXCHANGE OF DATA

BACKGROUND OF THE INVENTION

The present invention relates to a system for exchanging data, and in particular to such a system with various features that facilitate the exchange of data according to specific parameters.

A radio system is generally known in which selected radio stations have the ability to broadcast information to a large number of people. An individual person can, as desired, avail himself of what the radio station offers, but has only a limited ability to send information himself, or even to comment on or modify the information. The same applies to the broadcasting of television programs, which is reserved for a few selected television broadcasters. In these situations, the listener or viewer is acting strictly as a receiver of information.

In regard to written text as well, there exists a limited number of publishers that publish newspapers and distribute them to a large number of people. Here again, the individual can only consume what is offered and has only limited possibilities of influencing the information distributed. For example, in the case of newspapers there is the possibility of submitting letters from readers which are then, however, often shifted in time and often not printed in combination with the original information.

What is needed is a system in which an individual person is not only a receiver but also a transmitter of information and, as such, can have a direct influence on the information received by others.

SUMMARY OF THE INVENTION

A system for exchanging data includes at least two memory units each functioning as both a transmitter and a receiver of data. The exchange of data occurs whenever two memory units are within a certain distance of each other. The user of such a memory unit is thus capable of simultaneously being both a transmitter and a receiver of data, such that the transmitter can send data continuously but can receive data transmitted from other memory units only when the receiver is within a certain distance from a transmitter. As a result, data are received only by those memory units that are located in the immediate environment of the transmitter. Since the data transmitted can be selected personally by the user of the memory unit—the data being able to be transmitted in any form, for example, as music pieces, text, television broadcasts, or other forms—the data thus reflect the social environment in which the transmitter happens to be situated. To this end, each person preferably has such a memory unit which participates in the exchange of data so that information is exchanged through the memory units with every person encountered.

The exchange of data can be implemented using electrical or optical cables, laser light, or infrared interfaces or wireless interfaces. One possibility is a manually forced exchange of data, for example, through a link of two memory units by a cable and appropriate manual commands on one of the memory units. A desired approach is to use wireless transmission of data so personal contact need not be established with every user.

The distance between two memory units can be measured by a calibration signal. It is also possible to vary the distance between which an exchange of data occurs to be able to select a smaller receiving radius in a constrained space, for example, a shopping center, as opposed to more wide open spaces.

The memory units preferably have unique identifiers, which enable assignment of the received data to a specific memory unit. In particular, it enables control of data sent and received such that, for example, no data would be exchanged over a certain period of time with a memory unit with which data have already been exchanged. This ensures that when two memory units meet, certain data are exchanged only once.

The memory unit preferably has a memory capacity that can record large quantities of data. Only this way can the large quantity of data broadcast by all memory units in the immediate environment be stored in a receiving memory unit. In the event the capacity of the memory unit is exceeded, the newly received data should preferably not be rejected; instead, unimportant data or the oldest data are deleted based on certain rules to provide memory capacity for the new incoming data.

The exchange of data occurs in an automated fashion, thereby enabling large quantities of data to be transmitted and received. It would be difficult for an individual user to employ manual control of the data exchange to successfully exchange data with everyone in, for example, a shopping center.

Some portion or all of the data of a memory unit is automatically transmitted upon an encounter with another memory unit. The data involved here are primarily data upon which the transmitter places high value. The transmitted data are preferably stored on the receiving memory unit without the approval thereof. As a result, the user of the memory unit understands what people in his immediate environment consider to be important.

In addition, the exchange of data is controlled by a system of rules; for example, one memory unit is searched based on what another user is seeking. The system of rules can thus contain specific requests from the user, for example, for a certain musical piece. In addition, preferences defined by the user are contained in the system of rules regarding requested data to be received and recorded from other memory units. These preferences do not contain specific requests but instead indicate, for example, that all available data on a certain topic, for example, sports, should be transmitted to the user's memory unit.

The preferences contained in the rules system may be adapted to the user's behavior by monitoring the user. If certain data are not requested immediately or not at all within a certain period of time by the user, the relevant preference is given a lower priority. Data that can be linked to this preference will not be stored at all, or to a lesser extent, in the future. In addition, such data can be automatically deleted in order to release memory space for other more relevant data.

The data are provided with certain supplementary information, for example, an index which indicates the number of memory units to which data have been sent. As a result, the user knows the extent to which his data have been received by other memory units. In addition, the data with supplementary information have an index which indicates how often the user has received these data from various memory units. As a result, it is possible to estimate how many users consider this message to be important. In addition, these data with supplementary information have an index which indicates the number of different memory units the data from the original sender have passed through unmodified before being received. If this index is especially large, then many users consider this message in its original form to be important. In addition, the data with supplementary information have an index which indicates in how many different memory units these data have been modified. As a result, the user can retrace how often these data have been commented on by various users.

The data with supplementary information have meta-data which identify the relationship between different data. The above-described indexes supply information exclusively on the data itself. However, it is advantageous also to receive information on the relationship between the different data.

Among other things, the meta-data contain information on additional data that have been linked with the original data, preferably, either transmitted or received in combination. If, for example, two different data sets have been sent together, but a given user has received only one data set, the meta-data of this data set enable the user to receive information on the second data set, or to perform a targeted search of the second data set. In addition, from the meta-data a determination can be made as to how often certain data have been interlinked with other data by a user.

The meta-data preferably contain information on the identifier of the memory unit in which certain data have been linked to other data. This provides information as to whether a certain type of data has been linked to another type of data only in a certain memory unit.

Memory units can be associated with certain interest groups based on the meta-data. For example, if a user of a memory unit is interested primarily in specific topics, such as archaeology and pottery, the meta-data enable the user to seek out those memory units in which these topics preferentially occur in combination.

This feature provides another advantage in which those relationships between the data are preferentially considered which the members of a certain interest group have created.

The received data are preferably stored in the memory unit based on an organizing system of rules. The user profile is advantageously contained in the organizing system of rules. As a result, the user first encounters the data requested by him and the data that most closely meet his preferences.

Sorting can be performed in the organizing system of rules based on the indexes. As a result, the user is presented with data received or sent frequently, as the most important data.

Preferably, the meta-data of the data can be used in the organizing system of rules to organize the data. This enables, for example, data sent by members of a certain interest group to be listed first.

These and other objects, features and advantages of the present invention will become more apparent in light of the following detailed description of preferred embodiments thereof, as illustrated in the accompanying drawings.

BRIEF DESCRIPTION OF THE DRAWINGS

The sole FIGURE is a schematic view of a system for exchanging data.

DETAILED DESCRIPTION OF THE INVENTION

The FIGURE illustrates a system 5 having a multiplicity of persons 10 acting as users who have direct access to a quantity of data or information represented as dots 20. These data 20 are stored on memory units 30 that mutually communicate without direct access by the user 10. Certain data 20 are always linked, as illustrated by a connection line 40 between the data dots 20. These data are typically transmitted in combination, or correspond to similar preferences.

The FIGURE also illustrates an additional provider, referred to as a system provider 50, which is not necessarily an individual person. As with radio and television, in the system 5 a public or private establishment can also exist that participates in the exchange of data 20. On one hand, such an establishment can also transmit its own data 20. On the other hand, such an establishment can assume the task of observing developments and trends of the data 20 transmitted, immediately commenting on and, as necessary, moderating the news and messages. This way, a user 10 of the memory unit 30 can have a direct influence on the information 20 received by others.

For an individual person, the motivation for using such a memory unit 30 lies primarily in the ability to communicate with others and to be up-to-date with respect to the most current news and messages, while on the other hand transmitting his own messages and news.

Each memory unit 30 has a relative memory capacity. It is already feasible to fabricate hard discs with a memory capacity of 100 GB, and within the foreseeable future it will be possible to increase this memory capacity by several orders of magnitude. Such a large memory capacity is necessary in order to save the data transmitted by all persons 10 in the immediate environment, specifically in order to be able to transmit memory-intensive data such as videos.

The memory unit 30 can be connected by a cable link or an infrared interface to a computer through which the user 10 is able to transfer his own data 20 to the memory unit 30. In addition, the memory unit 30 can be connected to a television set or a video recorder in order to record television programs and videos. In addition, the memory unit 30 is equipped with a speech recognition program which converts texts or music pieces received through a microphone into written text or digital data.

The user is thus able to use different means to transfer his own data 20 to the memory unit 30. In addition, he can assign a weighting factor to the data 20 to determine which data 20 should be sent preferentially. In addition, he can indicate in his own system of rules regulating the exchange of data 20 between any two memory units 30 what type of data 20 he is seeking. On the one hand, specific requests, such as music pieces or a certain video may be indicated that are being sought on the memory units 30 of other users 10. In addition, preferences may be indicated, according to which the system of rules searches in an automated fashion for relevant data 20 on the other memory units 30. For example, a news text which the user 10 considers especially important can be given a high importance rating. However, it is also possible to provide a high importance rating to images, short videos, or rumors, so that these data 20 specifically will be transmitted to all memory units 30 with which data 20 are being exchanged.

The memory unit 30 is equipped with an interface which enables a wireless exchange of data with other memory units 30. It is also possible, however, to exchange data 20 with other memory units 30 through a cable. However, direct contact with a user 10 of another memory unit 30 is required for this purpose. It is a desirable feature that the user's 10 own data 20 are transmitted preferentially through a wireless interface to as many units 30 as possible, without knowing exactly who is requesting these data 20.

In addition, the memory unit 30 sends out a calibration signal, based on which the distance to the other memory units 30 can be estimated. The user 10 can select a specific receiving radius indicating the distance within which data 20 are exchanged with other memory units 30.

The user 10 now moves with his memory unit 30 in areas in which he encounters other users 10 of memory units 30. Whenever another memory unit 30 is located within the receiving radius of this own memory unit 30, data 20 are exchanged between the two memory units 30. Each memory unit 30 functions simultaneously as a transmitter and a receiver.

Initially, each memory unit 30 transmits what the user 10 considers to be especially important information or data 20. The user 10 has the choice as to whether he wants as a rule to store on his memory unit 30 all of the data 20 sent by other memory units 30, or to interpose a filter which accepts for storage only data 20 having certain characteristics. For example, only data 20 that matches the preferences of the user 10 can be selected. It is also possible to accept only data 20 having high indexes, as described below. As a result, only part of the data 20 being sent by another memory unit 30 is initially received.

In addition, the other memory unit 30 is searched by the memory unit 30 in an automated fashion for that which corresponds to the user profile. The search here can, on the one hand, be for specific data 20 such as music pieces or, on the other hand, the memory unit 30 can be searched for the data 20 that most closely match the preferences of the user 10. Data 20 that are received frequently can be relayed on, preferably in an automated fashion.

The data 20 continue to be exchanged between the two memory units 30 as long as the other memory unit 30 is located within the receiving radius of the user's memory unit 30. In the event data 20 are exchanged for which the transmission time is longer than the exchange time between the two memory units 30—for example, because a certain video was sought by the user 10—it is possible for his own memory unit 30 to register which segment of the video has already been transmitted, then to transfer the next segment of the video during a subsequent encounter with a third memory unit 30 on which this video is also located. As a result, larger data sets 20 may be transferred piecewise to the users own memory unit 30 from different memory units 30.

The transmitted data 20 can be linked with different indexes and meta-data. A first index to the user's own data 20 indicates the number of memory units 30 to which the corresponding data 20 have been transmitted. In addition, the user 10 can determine how many memory units 30 have not accepted the data 20 since they did not match the profile of the user 10 of the other memory unit 30. The user 10 thus gains an overview as to how interesting his own data 20 were for other users.

A second index to the data 20 contained by the other memory units 30 indicates how often the user 10 has received these data 20 from various memory units 30. This provides the user 10 with an overview of which messages are currently considered important by many people.

A third index indicates the number of different memory units 30 through which the data 20 from the original transmitter have passed unmodified before they were received on the user's memory device 30. Each time these data 20 are transmitted from one memory unit 30 to the next unit 30 this index is incremented by 1. This index also indicates how important the general public considers these data 20 to be.

Another index indicates the number of different memory units 30 on which these data 20 have been modified. The user of a memory unit 30 is provided with the ability to pass on the received data 20, such as text together with his own commentaries.

The indexes relate exclusively to the data set 20 to which they have been assigned. In addition, meta-data are sent together with the data 20, the meta-data identifying the relationship between different data 20. Using the meta-data, the user 10 can determine which additional data 20 have been sent or received in combination with the original data 20. For example, if in the "Sports" category one of the top messages has a report about a new world record, and if in 90% of the messages sent this message is sent simultaneously together with the interview of the relevant athlete, yet the user 10 of the memory unit 30 has received only the first message, the meta-data enable him to learn about the second item and then perform a targeted search for it. The meta-data additionally provide information about how often certain data 20 are linked with other data 20 by a user 10. In the above example of a world record, the rumor about suspected doping on the part of the athlete may, for example, be significantly more interesting than the interview with the athlete.

Each memory unit 30 contains a unique identifier which is simultaneously transmitted together with the meta-data. Specifically, the meta-data contain the identifier of the memory unit 30 in which certain data 20 have been linked with other data 20. This is especially interesting for a user 10 of a memory unit 30 in cases when certain memory 30 are associated with certain interest groups, and this information is transmitted by the meta-data. When data 20 are exchanged, the relationship of data 20 can be taken into account that has been created by members of a certain interest group. A user 10 primarily interested in information about "Science and Technology" thus has the ability both to filter out corresponding data 20 based on his user profile, and to request data 20 in a targeted fashion from those memory units 30 whose users 10 are also interested in this subject.

If the user 10 does restrict reception of incoming data 20 by means of a system of rules, but allows all incoming data 20 to be stored in the memory unit 30, he thus obtains information about all the people he has encountered. Depending on the environments in which he is located, the received data 20 will reflect the social environment. If he is located in school, for example, the top messages could include mathematics homework or the latest information on the new Latin teacher. In a shopping center, the most important messages may involve which products are on sale. The type of music pieces exchanged will also vary significantly in different environments. Furthermore, one and the same message may be subject to completely different commentary and modified accordingly in one environment than in another environment.

The incoming data 20 are filed in the memory unit 30 according to an organizing system of rules. This system of rules takes into account both the user profile and the indexes and the meta-data. If the memory capacity is too small for all incoming data 20, the system of rules can decide automatically which data 20 are either interesting or unimportant to the user 10. Any data 20 that do not match the user profile can be automatically deleted to leave space for additional incoming data 20.

At any given point in time, the user 10 obtains an overview of the data 20 received. For example, he can have the top messages listed, or messages which have been newly received on that day. He can check whether his transmitted data 20 have been accepted by the overwhelming majority of memory units 30 contacted. In addition, he can modify data 20 received and display the data 20 that most closely match his user profile. Specifically, he obtains a snapshot of the social structure with which he has had contact on that day.

Although the present invention has been shown and described with respect to several preferred embodiments thereof, various changes, omissions and additions to the form and detail thereof, may be made therein, without departing from the spirit and scope of the invention.

What is claimed is:

1. A system for exchanging data, comprising at least two memory units, each memory unit being configured both as a wireless transmitter of data and a wireless receiver of data, where an exchange of data directly between at least two of the memory units automatically occurs whenever the two memory units are within a certain distance from each other, where the distance between the units is variable over time, where an exchange of data is controlled by at least one preference defined by a user of one of the memory units and relating to requested data to be received from another one of the memory units, where the data transmitted from one of the memory units to another one of the memory units are provided with supplementary information that relates to the transmitted data and are also provided with meta-data separate from the supplemental information which identify at least one relationship between the data exchanged between the at least two memory units, where the supplementary information includes an index which indicates the number of the memory units with the data from the memory unit that transmitted data in which the data have been received without modification by one of the memory units and where the supplementary information includes an index which indicates in how many of the memory units have modified the data, and the supplemental data is included in the automatic exchange of data between the at least two of the memory units.

2. The system of claim 1, where the distance between the at least two memory units can be determined by a calibration signal.

3. The system of claim 1, where each of the at least two memory units has a unique identifier.

4. The system of claim 1, where for a predetermined period of time no additional data are exchanged with a certain one of the memory units with which data have already been exchanged.

5. The system of claim 1, where a portion of the data from a first one of the memory units is transmitted automatically to a second one of the memory units.

6. The system of claim 1, where the data transmitted from one of the memory units is stored on another one of the memory units.

7. The system of claim 1, where one of the memory units is searched for data by user-defined preferences.

8. The system of claim 1, where the user-defined preferences are adapted to the behavior of the user of one of the memory units.

9. The system of claim 1, where the supplementary information includes an index which indicates the number of memory units to which the corresponding data have been transmitted.

10. The system of claim 1, where the supplementary information includes an index which indicates how often the user has obtained the data from certain ones of the memory units.

11. The system of claim 1, where the meta-data contain information on additional data which have been linked to the data.

12. The system of claim 1, where from the meta-data a determination can be made as to how often certain data have been interlinked by a user with other data.

13. The system of claim 1, where the meta-data contain information about an identification of the memory unit in which certain data have been linked with other data.

14. The system of claim 13, where the memory units can be associated with certain interest groups based on the meta-data.

15. The system of claim 14, where the exchange of data is a function of relationships which have been created by members of a certain interest group.

16. The system of claim 1, where data received during the exchange of data are stored in the memory unit according to an organizing system of rules.

17. The system of claim 16, where the organizing system of rules contains a profile of the user.

18. The system of claim 16, where the organizing system of rules is sorted based on indexes.

19. The system of claim 16, where in the organizing system of rules the data is organized based on meta-information of the data.

20. A device for exchanging data, comprising:
a microphone that provides audio data;
a memory unit that includes an executable speech recognition program;
a wireless receiver that receives incoming data and provides received incoming data;
a processor that receives and compares the received incoming data to receiver rules to decide if the received incoming data satisfies the receiver rules and if so the processor writes the received incoming data to the memory unit, and the processor processes the audio data using the speech recognition program; and
a low power wireless transmitter that transmits information stored in the memory unit to another device, where the transmitted information includes supplementary information that relates to the transmitted information and also includes meta-data separate from the supplemental information which identify at least one relationship involving the transmitted data, where the supplementary information includes an index which indicates the number of the memory units with the data from the memory unit that transmitted data in which the data have been received without modification by one of the memory units and where the supplementary information includes an index which indicates in how many of the memory units have modified the data, and the supplemental data is included in the automatic exchange of data between the at least two of the memory units.

21. A system for exchanging data, comprising:
at least two memory units, each memory unit being configured both as a wireless transmitter of data and a wireless receiver of data;
where an exchange of data between at least two of the memory units occurs directly whenever the two memory units are within a certain distance from each other;
where the distance between the units is variable over time;
where an exchange of data is controlled by at least one preference defined by a user of one of the memory units and relating to the data to be received from another one of the memory units; and
where the data transmitted from one of the memory units to another one of the memory units are provided with supplementary information and meta-data which identify at least one relationship between the data exchanged between the at least two memory units, the meta-data at least associated with aiding one of the memory units in completing an interrupted data transfer, where the supplementary information includes an index which indicates the number of the memory units with the data from the memory unit that transmitted data in which the data have been received without modification by one of the memory units and where the supplementary information includes an index which indicates in how many of the memory units have modified the data, and the supplemental data is included in the automatic exchange of data between the at least two of the memory units.

* * * * *